Nov. 1, 1960     W. N. POUNDSTONE     2,958,410
BELT CLAMP

Filed June 17, 1958     3 Sheets—Sheet 1

INVENTOR.
WILLIAM N. POUNDSTONE
BY
HIS ATTORNEY

Nov. 1, 1960 W. N. POUNDSTONE 2,958,410
BELT CLAMP

Filed June 17, 1958 3 Sheets-Sheet 2

INVENTOR.
WILLIAM N. POUNDSTONE
BY
*Stanley J Price*
HIS ATTORNEY

Nov. 1, 1960  W. N. POUNDSTONE  2,958,410
BELT CLAMP

Filed June 17, 1958  3 Sheets-Sheet 3

INVENTOR.
WILLIAM N. POUNDSTONE
BY
HIS ATTORNEY

United States Patent Office 2,958,410
Patented Nov. 1, 1960

2,958,410

BELT CLAMP

William N. Poundstone, Morgantown, W. Va., assignor to Consolidation Coal Company, Pittsburgh, Pa., a corporation of Pennsylvania Filed June 17, 1958, Ser. No. 742,561

14 Claims. (Cl. 198—1)

This invention relates to a belt clamp and more particularly to a belt clamp adapted to be used with an endless belt conveyer having its conveying reach supported by a pair of flexible strands.

With the development of the flexible strand or rope conveyer problems have arisen in both repairing damaged conveyer belt and in adding belting to the conveyer system.

It has been the practice in the past with conventional pan section type of endless belt conveyer systems to wedge a portion of the belting to the pan section by means of wooden wedge members. The rigid pan section provided a base for the wedges to maintain the belt in tension. The flexible strand type supporting means has eliminated this base portion and makes it extremely difficult to add belting to the system. Further, repairing damaged belting is both laborious and time consuming since there is no longer any fixed supporting means for the belting. With my invention I have provided a means of maintaining a section of the belting in tension so that additional belting may be easily added to the system. I have also provided a simple method of repairing damaged belting.

Accordingly, the principal object of this invention is to provide a belt clamp which maintains a section of the belting in tension.

Another object of my invention is to provide apparatus and a method of inserting additional belting into a flexible strand supported conveyer system.

A further object of my invention is to provide apparatus for repairing damaged belting.

These and other objects and advantages will be more completely described and distinctly pointed out in the following specification, the accompanying drawings and the appended claims.

In the accompanying drawings to be taken as part of this specification, I have fully and clearly illustrated several embodiments of my invention, in which drawings.

Figure 1:
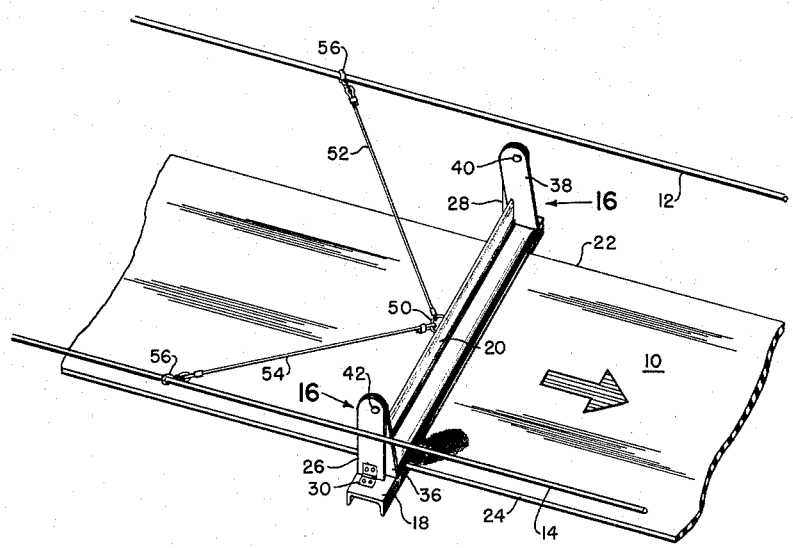
Figure 1 is a perspective view of one embodiment of my belt clamp.
Figure 3:
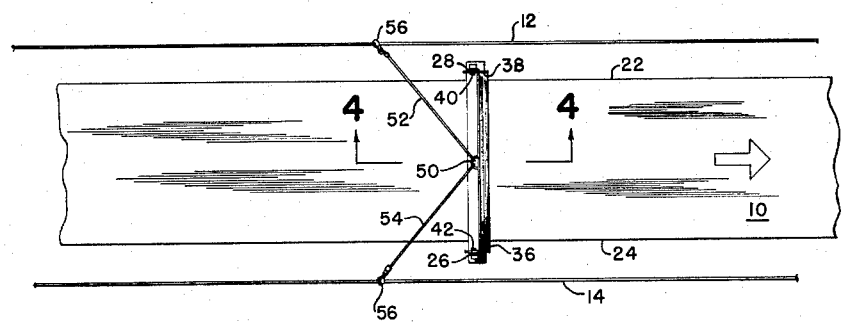
Figure 3 is a top plan view of the belt clamp illustrated in Figure 1.
Figure 4:
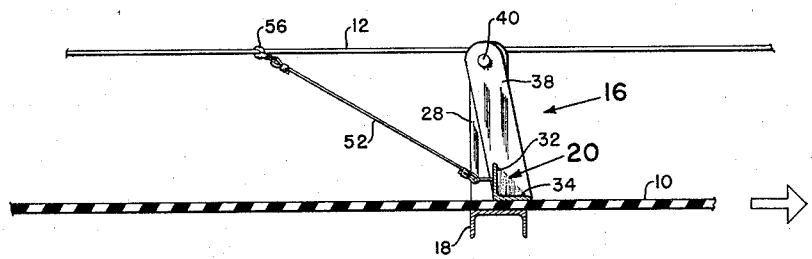
Figure 4 is a section taken along the line 4—4 of Figure 3 and illustrating my belt clamp in detail.

Referring to the drawings and particularly Figures 1, 3 and 4, there is shown the conveyer reach 10 of my conveyer belt positioned below and supported by a pair of flexible strands 12 and 14. The arrow indicates the direction of tension or pull on the conveyer reach.

Figure 6:
Figure 6 is a fragmentary perspective of an end portion of my belt clamp illustrating the hinged connection for one of the armed members and the pin connection between a pair of arms.

The embodiment of my belt clamp illustrated in Figures 1, 3 and 4 is generally designated by the numeral 16 and has a channel shaped base member 18 and an angularly shaped top member 20. Both the base member 18 and top member 20 extend laterally across the belt 10. The lengthwise dimension of the base member 18 is such that it extends beyond the side edges 22 and 24 of the belt 10. The base member 18 has a pair of vertical arms 26 and 28 extending upwardly therefrom adjacent its edge portions. The arm 28 may be secured to the base member 18 in any conventional manner such as welding or the like. The arm 26 is hingedly secured to the base member 18 by means of the hinge 30. With this hinged arrangement the arm 26 may fold or pivot outwardly relative to the base member 18 to facilitate positioning of the clamp member 16 around the belt 10 as will be explained later. The top member 20 as previously stated is angularly shaped and has a vertical leg 32 and a horizontal leg 34 and has a pair of upwardly extending arm members 36 and 38 positioned adjacent its end portions. The arms 36 and 38 are rigidly secured to the top member 20 as by welding or the like and cant rearwardly relative to the horizontal leg 34 (see Figure 4). The top member arms 36 and 38 are arranged in juxtaposition with the respective base member arms 26 and 28. The arms 36 and 38 have outwardly extending pin members 40 and 42 one of which is shown in detail in Figure 6. The pins 40 and 42 have enlarged head portions 44 in spaced relation with the respective arm members.

The base vertical arms 26 and 28 have apertures 46 extending therethrough with slotted portions 48 in communication therewith to form a keyway type aperture.

The top member 20 has a strand securing member extending from the vertical leg 32 intermediate its edge portions. A pair of flexible cables 52 and 54 are secured at one end to the strand securing member 50. The other ends of the cables 52 and 54 are secured to the respective adjacent flexible strands 12 and 14 by means of detachable clips 56. The clips 56 may be of any conventional construction which provides for a frictional engagement between the flexible strands 12 and 14 and the flexible cables 52 and 54.

The clamp 16 is positioned with the belt 10 between the base member 18 and the top member 20 as follows. The top member arm 36 is disengaged from the base member 26 by pivoting the base member arm 26 until the pin 42 passes through the aperture 46. The base member arm 26 is then pivoted away from the top member arm 36 and the belt 10 is inserted between the base member 18 and top member 20. The base member arm 26 is then pivoted toward the top member arm 36 and the pin 42 is again reinserted in the aperture 46 and rests in the slotted portion 48. The cables 52 and 54 are then secured to the flexible strands 12 and 14 by means of the clips 56. The base member 18 is then pivoted about the pins 42 relative to the top member 20 until the belt 10 is wedged between the top member 20 and the base member 18. The tension or pull on the belt 10 will further wedge the belt between the base member 18 and top member 20. Tension can then be relieved on the left-hand side of the clamp 16 as viewed in Figure 1 while the clamp 16 will maintain a portion of the belt on the right hand side of the clamp 16 in tension.

Figure 2:
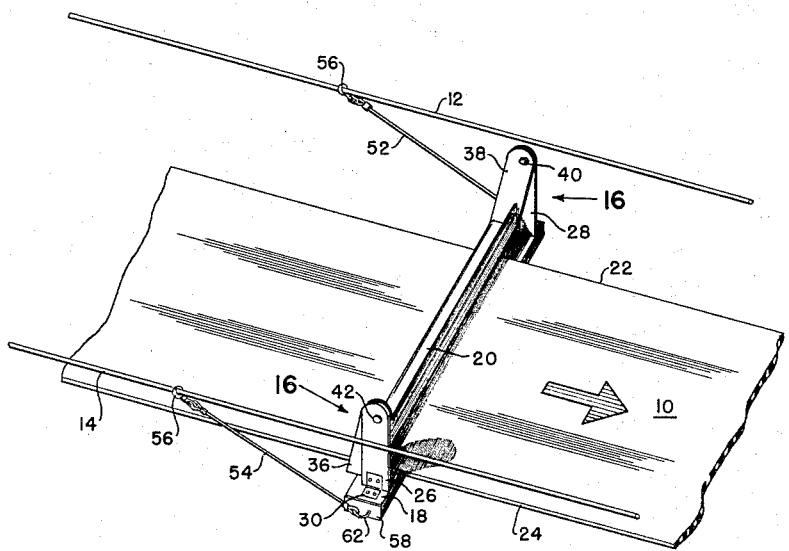
Figure 2 is a perspective view of another embodiment of my belt clamp.

A second embodiment of my belt clamp is illustrated in Figure 2 where similar numerals will indicate similar parts. In respect to Figures 2 and 5 it should be noted that the base member 18 has a pair of depending edge portions 58 and 60 to which are secured cable securing means 62. The flexible cables 52 and 54 are then connected at one end to the cable securing means 62 adjacent the ends of the base member 18 and at their other end to the flexible strands 12 and 14 by means of the clips 56. Other than this feature, the construction of the two embodiments is substantially similar.

Figure 5:
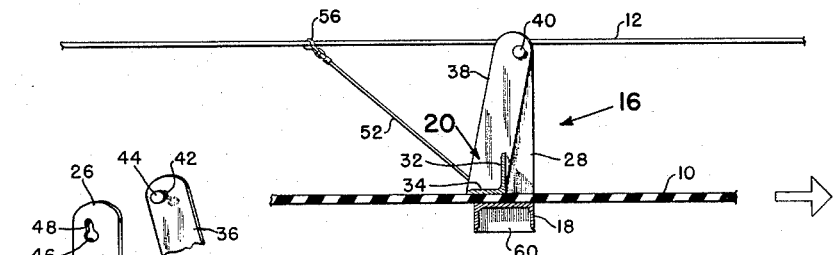
Figure 5 is a view similar to Figure 4 illustrating in section the embodiment shown in Figure 2.

The embodiment of my belt clamp 16 illustrated in Figures 2 and 5 is positioned with the belt 10 between the upper top member 20 and base member 18 in the same manner as the embodiment illustrated in Figure 1. To wedge the belt 10 therebetween the top member 20 is pivoted until the belt 10 is wedged therebetween. Further wedging action occurs by means of the tension exerted on the belt 10. The embodiment of my belt clamp illustrated in Figure 2 may be used on either the conveying reach or the return reach of the conveyer since the flexible cables 52 and 54 are positioned beyond belt side edges 22 and 24 so that they would not interfere with the conveyer reach which is conventionally positioned above the return reach.

Figure 7:
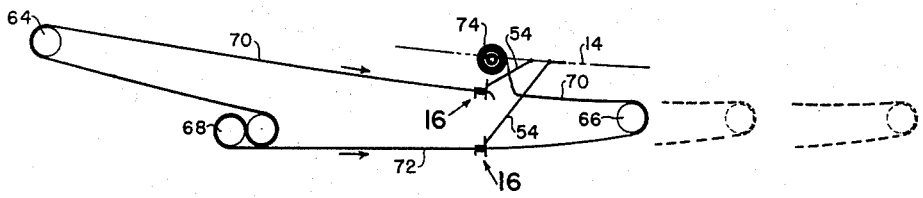
Figure 7 is a schematic view of a conveyer belt system employing my belt clamps to provide a means for adding additional belting.

In Figure 7 there is a diagrammatic showing of how additional belting can be inserted into a flexible strand supported conveying system. Usually the distance between the head pulley, schematically illustrated in Figure 7 as 64, and the tail pulley 66 is several hundred feet. The drive mechanism 68 pulls the conveying reach 70 around the head pulley 64 and the return reach 72 is pulled around the tail pulley 66. In conventional conveyer operation, the material is discharged onto the conveying reach 70 adjacent the tail pulley 66 and is discharged from the conveying reach 70 at the head pulley 64. It is desirable to maintain a portion of the conveying reach 70 and return reach 72 in tension as additional belting is added to the conveyer system. In Figure 7 a pair of my belt clamps 16 are illustrated wedging portions of the conveying reach 70 and return reach 72 therebetween. The clamps 16 are shown as schematically having their flexible cables 52 and 54 secured to the flexible strands 12 and 14. A roll of additional belting is schematically indicated at 74. The method of inserting the additional belting from the roll 74 is as follows. Portions of the conveying reach 70 and return reach 72 are maintained in tension between the clamps 16 and the head pulley 64. The conveying reach 70 is then separated adjacent the upper clamp 16 as illustrated. The free end of the belting on roll 74 is spliced to the free end of the conveying reach 70 and the tail pulley 66 is advanced as indicated in dotted lines. As the tail pulley 66 advances the belting on roll 74 is payed out and inserted into the conveying system. The tail pulley 66 is advanced until all the belting on roll 74 is payed out; the other end of the belting is then spliced to the free end of the conveying reach 70 adjacent the clamp 16. The clamps 16 are then removed from the conveying reach 70 and return reach 72 and the conveyer system with the additional belting is now ready for operation.

Figure 8:
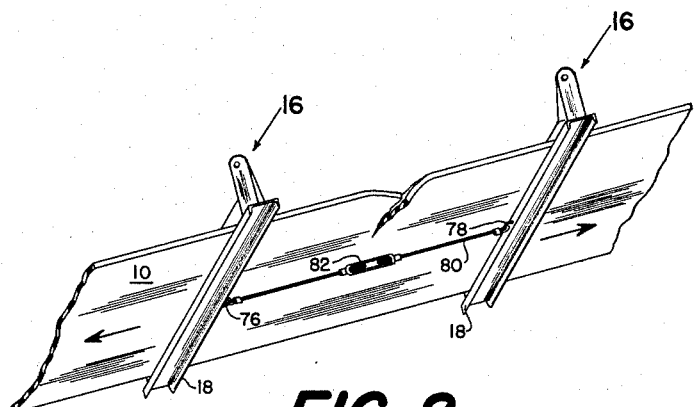
Figure 8 is a perspective view of another embodiment of my belt clamp as it is employed during the repair of damaged belting.

A further problem which is present in the flexible strand supported belt conveyer is the repair of damaged or torn belting. The usual practice is to cut the belting on opposite sides of the damaged area and then resplice the belting in a conventional manner. Without my clamps it would be necessary for the tail pulley to move toward the head pulley to eliminate tension on the belting so that the damaged portion may be removed. The tail pulley would then be required to advance and again provide the proper tension on the belting. This is both a laborious and time consuming process. With the belt clamps illustrated in Figure 8 it is now a relatively simple procedure to repair and splice the damaged belting. A pair of my clamps 16 are positioned with the belting 10 therebetween. The left hand clamp 16 as viewed in Figure 8 is adapted to wedge the belting therebetween and maintain in tension the portion of the belting on the lefthand side of the left hand clamp 18. Similarly, the righthand clamp 16 is positioned on the belting 10 and arranged to maintain tension as indicated by the arrow on the righthand portion of the belting as viewed in Figure 8. The base members 20 each have cable securing means 76 and 78 secured thereto so that the securing members 76 and 78 face each other. A flexible cable 80 is secured at its free ends to the securing members 76 and 78. The cable 80 includes a turnbuckle 82 that may be rotated to pull the respective clamps 16 toward each other and thereby relieve tension on the portion of the belt between the respective clamps 16. After this tension has been removed the damaged portion of the belt can be properly removed, trimmed and spliced. The cable 80 is then disconnected from both of the clamps 16, and the clamps 16 are removed in a conventional manner so that the belt is again serviceable.

According to the provisions of the patent statutes, I have explained the principle, preferred constructions, and mode of operation of my invention, and have illustrated and described what I now consider to represent its best embodiments. However, I desire to have it understood that, within the scope of the appended claims, the invention may be practiced otherwise than as specifically illustrated and described.

I claim:

1. In a belt clamp the combination comprising a first member and a second member, said second member arranged in overlying relation with said first member, said first member having a planar belt engaging surface and a pair of upwardly extending arms arranged in spaced relation to each other, said second member having a planar belt engaging surface and a pair of upwardly extending arms arranged in spaced relation to each other, said second member arms and said first member arms positioned in overlying relation with each other, means connecting said first member arms to said second member arms so that one of said members arcuately pivots relative to said other member to thereby move said first member planar belt engaging surface and said second member planar belt engaging surface relative to each other in a direction substantially normal to said planar surfaces, and supporting means connected to one of said members.

2. In a belt clamp as set forth in claim 1 in which said connecting means includes pin members secured to the arms of one of said members and extending outwardly therefrom, said other arms having pin receiving apertures therethrough, said pin members extending through said other arm apertures to thereby pivotally connect said members to each other, said pins and apertures arranged so that said first and second members are adapted to wedge a conveyer belt therebetween at the lowermost portion of the pivotal arc.

3. In a belt clamp as set forth in claim 2 in which said pin members are spaced to one side of the central longitudinal axis of said arm members and said other arm apertures spaced to one side of said other arm central longitudinal axis.

4. In a belt clamp as set forth in claim 2 in which said pin members include an enlarged head portion spaced from said respective arm and said other arms having a slotted portion in communication with said apertures, said slotted portion having a lateral dimension less than the lateral dimension of said pin head portion.

5. In a belt clamp as set forth in claim 1 in which one of said arms is hingedly secured to said first member so that said arm is arranged to pivot outwardly from said first member.

6. In a belt clamp for use with an endless flexible belt conveyer having its conveying reach supported by a pair of flexible stands, the combination comprising, a flexible conveyor belt having a conveying reach, a pair of flexible strands supporting said conveying reach, a base member adapted to be positioned beneath and extend laterally of said belt, said base member having a pair of upwardly extending arms spaced on opposite sides of said belt, a top member adapted to be positioned above and extend laterally of said belt, said top member positioned in overlying relation with said base member and with said belt therebetween, said top member having a pair of upwardly extending arms between said base member arms, said top member arms and said base member arms positioned in overlying relation with each other, means pivotally connecting said top member arms to said base member arms so that said base member upon pivotal movement toward said top member wedges said belt therebetween, and means securing said top member to said pair of flexible strands to thereby fixedly secure said conveyer belt relative to said strands.

7. A belt clamp as set forth in claim 6 in which one of said belt member arms is hingedly connected to said base member so that said arm pivots outwardly to thereby position said belt between said base member and said top member.

8. A belt clamp as set forth in claim 7 in which said arm connecting means includes pin members secured to and extending outwardly from said top member arms, said base member arms having apertures therethrough, said pin members adapted to extend through said apertures and thereby pivotally connect said top member to said base member.

9. In a belt clamp as set forth in claim 6 in which said securing means includes a pair of flexible cables each secured at one end to said top member, and each having their other end detachably secured to said respective flexible strand.

10. In a belt clamp for use with an endless flexible belt conveyer having its conveying reach supported by a pair of flexible strands, the combination comprising, a flexible conveyor belt having a conveying reach, a pair of flexible strands supporting said conveying reach, a base member adapted to be positioned beneath and extend laterally of said belt, said base member having a pair of upwardly extending arms spaced on opposite sides of said belt, a top member adapted to be positioned above and extend laterally of said belt, said top member positioned in overlying relation with said base member with said belt therebetween, said top member having a pair of upwardly extending arms between said base member arms, said top member arms and said base member arms positioned in overlying relation with each other, means pivotally connecting said top member arms to said base member arms so that said top member upon pivotal movement toward said base member wedges said belt therebetween, and means securing said bottom member to said pair of flexible strands to thereby fixedly secure said conveyer belt relative to said strands.

11. A belt clamp as set forth in claim 10 in which one of said base member arms is hingedly connected to said base member so that said arm pivots outwardly to thereby position said belt between said base member and said top member.

12. A belt clamp as set forth in claim 11 in which said securing means includes a pair of flexible cables each secured at one end to said bottom member adjacent its end portion, said flexible cables each having their other ends detachably secured to said respective adjacent flexible strands.

13. Belt clamping means adapted to be used in repairing damaged belting which comprises in combination, a flexible conveyor belt, a pair of belt clamps, each of said belt clamps including a base member adapted to be positioned beneath and extend laterally of said belt, said base member having a pair of upwardly extending arms spaced on opposite sides of said belt, a top member adapted to be positioned above and extend laterally of said belt, said top member positioned in overlying relation with said base member and with said belt therebetween, said top member having a pair of upwardly extending arms between said base member arms, said top member arms and said base member arms positioned in overlying relation with each other, means pivotally connecting said top member arms to said base member arms so that said top member upon pivotal movement toward said base member wedges said belt therebetween, said belt clamps adapted to be positioned on opposite sides of the damaged portion of said belt with said belt wedged between said respective belt clamps, securing means connecting said base member of each of said belt clamps to each other, and means to move said belt clamps toward each other to thereby relieve tension on said belt between said belt clamps to facilitate repair of the damaged portion of said belt.

14. In a belt clamp adapted to be used with an endless flexible belt conveyer having its conveying reach supported by a pair of flexible strands the combination comprising, a flexible conveyor belt having a conveying reach, a pair of flexible strands supporting said conveying reach, a base member adapted to be positioned beneath and extend laterally of said belt, a top member adapted to be positioned above and extend laterally of said belt, said top member positioned in overlying relation with said base member and with said belt therebetween, said top member having a pair of spaced upwardly extending arms positioned on opposite sides of said belt, means pivotally connecting the upper portions of said arms with said base member so that said base member upon pivotal movement toward said top member wedges said belt therebetween, and means securing said top member to said pair of flexible strands to thereby secure said conveyer belt relative to said strands.

References Cited in the file of this patent
UNITED STATES PATENTS

| | | |
|---|---|---|
| 876,881 | Johnson | Jan. 14, 1908 |
| 2,363,872 | Kiessling | Nov. 28, 1944 |
| 2,846,051 | Craggs et al. | Aug. 5, 1958 |